United States Patent [19]

Archer

[11] Patent Number: 5,177,675

[45] Date of Patent: Jan. 5, 1993

[54] ZERO VOLTAGE, ZERO CURRENT, RESONANT CONVERTER

[75] Inventor: Michael P. Archer, Westlake Village, Calif.

[73] Assignee: Shindengen Archer Corp., Westlake Village, Calif.

[21] Appl. No.: 778,311

[22] Filed: Oct. 16, 1991

[51] Int. Cl.⁵ .......................................... H02M 3/337
[52] U.S. Cl. ...................................... 363/25; 363/134
[58] Field of Search .................. 363/16, 17, 24–28, 363/97, 134

[56] References Cited

U.S. PATENT DOCUMENTS 4,774,649  9/1988  Archer .................................. 363/97
4,796,173  1/1989  Steigerwald ........................... 363/25
4,823,249  4/1989  Garcia .................................. 363/24
4,959,765  9/1990  Weinberg .............................. 363/24
5,073,849  12/1991 Morris ................................. 363/24

FOREIGN PATENT DOCUMENTS 392420  10/1990  European Pat. Off. .

Primary Examiner—William H. Beha, Jr.
Attorney, Agent, or Firm—Jessup, Beecher & Slehofer

[57] ABSTRACT

A zero current/zero voltage resonant DC to DC converter operating at high frequency, utilizes the series/parallel approach to power conversion. A resonant transformer assembly is inserted into either the primary or secondary of the main transformer, to optimize the operating parameters of the converter.

8 Claims, 4 Drawing Sheets

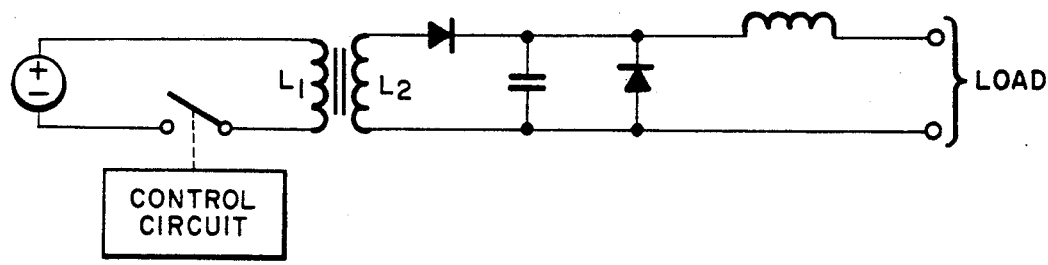
Fig. 1A. PRIOR ART (Vinciarelli)
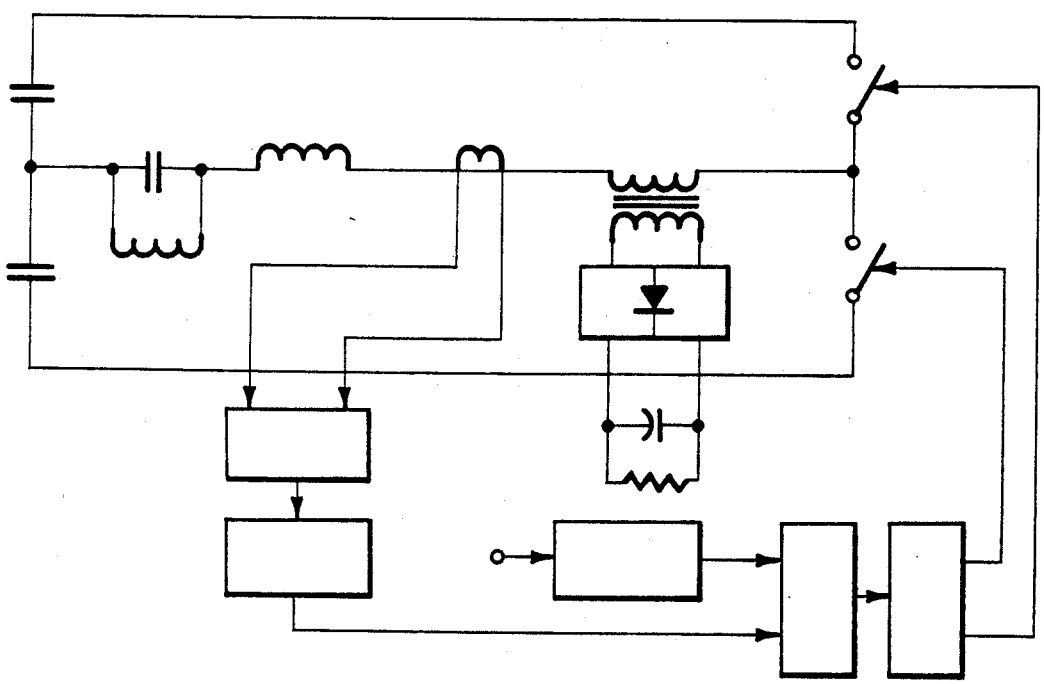
Fig. 1B. PRIOR ART (Panasonic)
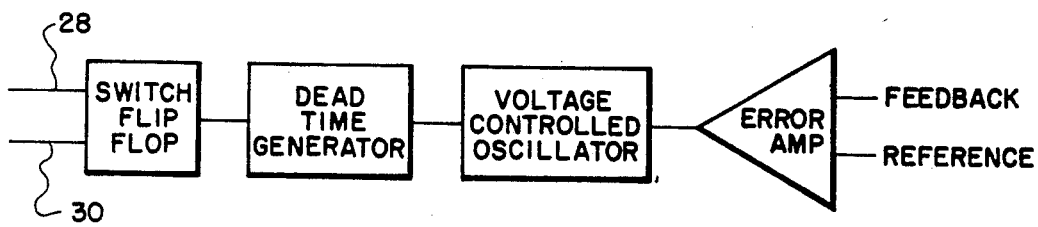
Fig. 6.

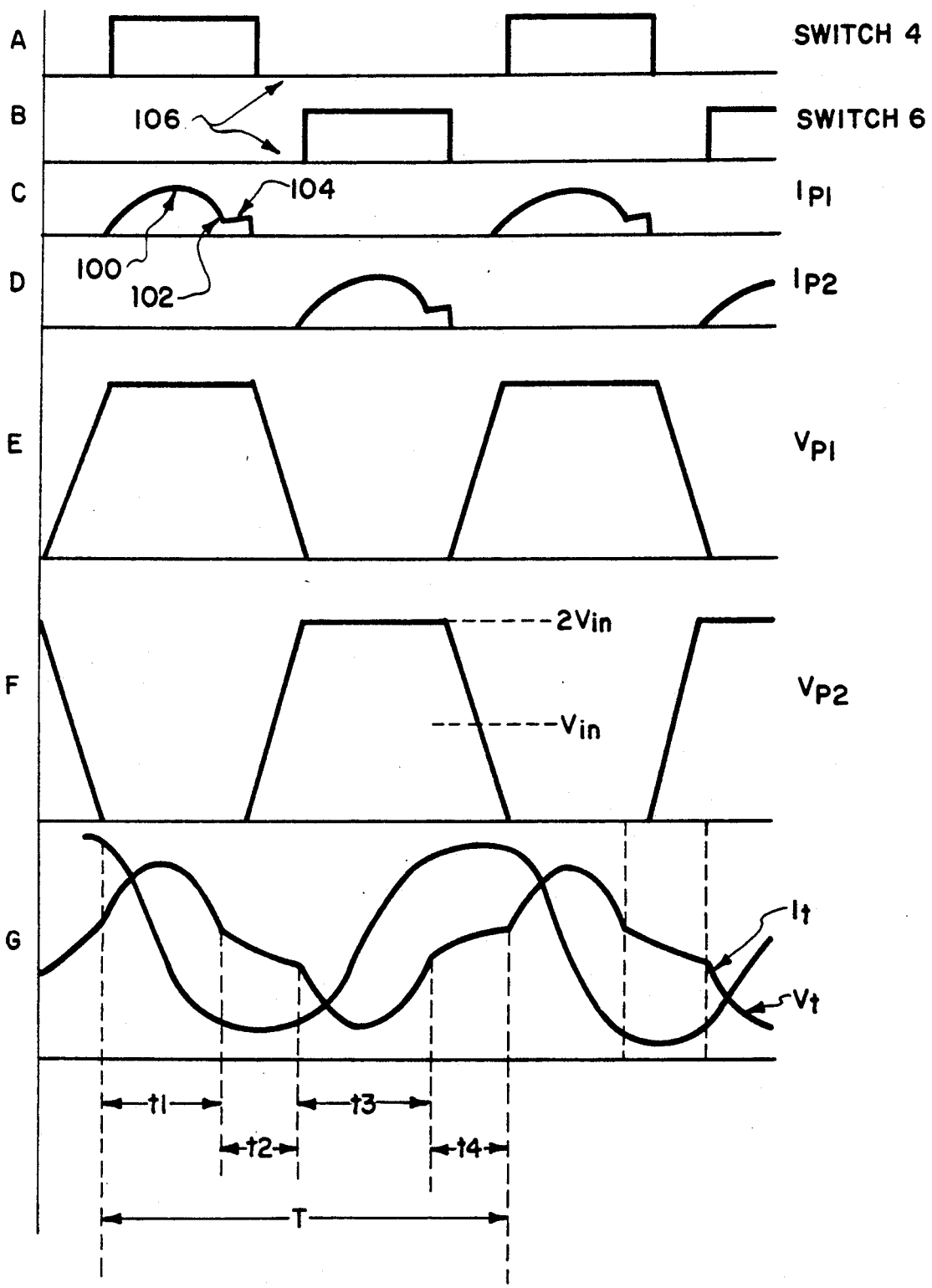
Fig. 3. OPERATIONAL WAVEFORMS (MED LOAD)

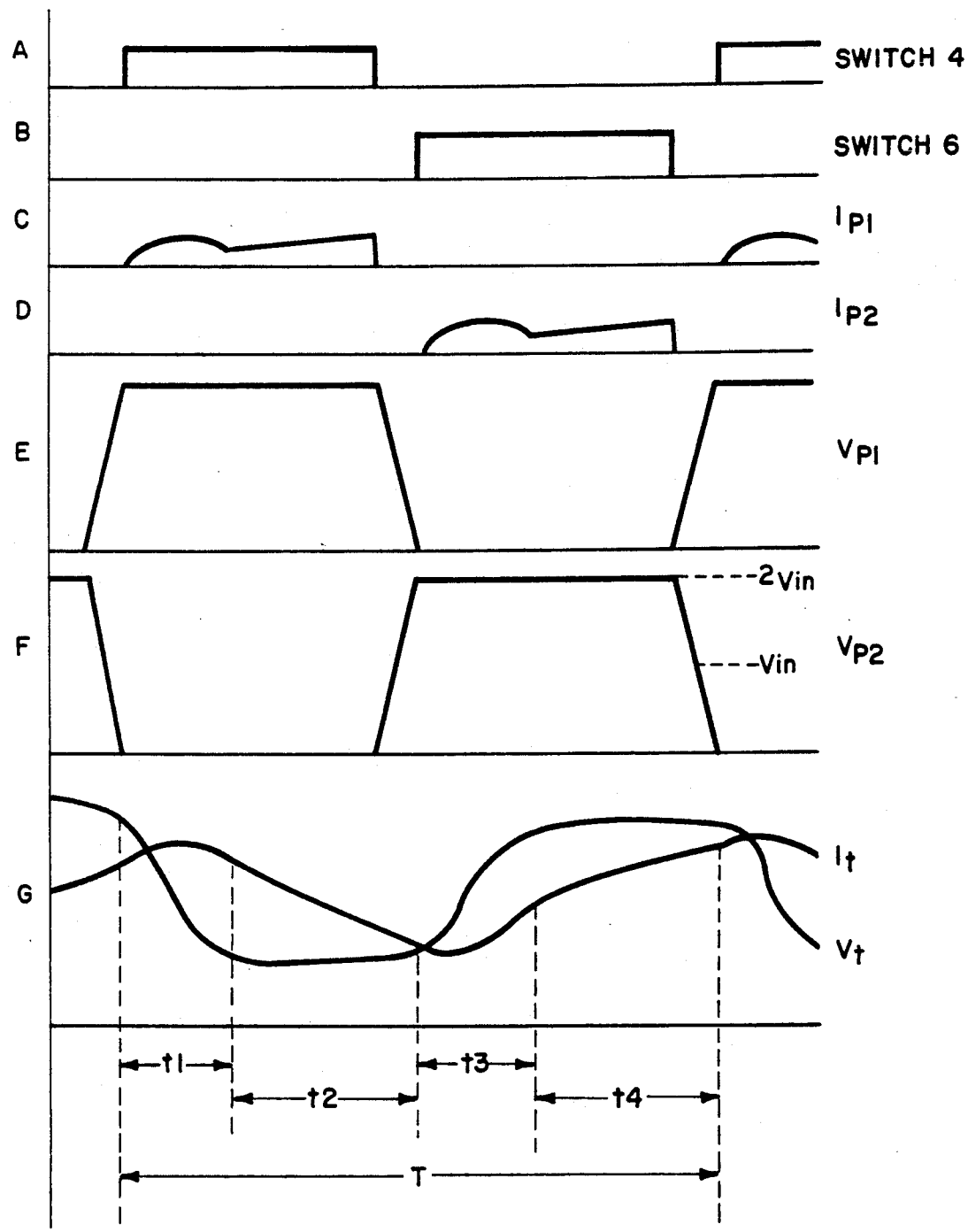
Fig. 4. OPERATION WAVEFORMS (LIGHT LOAD)

ZERO VOLTAGE, ZERO CURRENT, RESONANT CONVERTER

FIELD OF INVENTION

This technology relates to DC to DC converters and more specifically to resonant DC to DC converters.

BACKGROUND OF THE INVENTION

There are various converters hat change one magnitude DC voltage to another. Conventional converters such as forward and flyback converters are well described as the prior art. Many text's such as George Chryssis "High-Frequency Switching Power Supplies: Theory and Design", McGraw Hill Book Co., can explain the operation of converters such as these.

Conventional converters all use forced commutation means to control the voltage and current in the regulation and power transfer process. This forced commutation means of regulation causes two types of problems. The first is the losses associated with the forced commutation. Since there is a finite time associated with the turn on and turn off of a switching element, the current flowing in the switch and the voltage across the switch will overlap during switching transitions causing a loss called switching loss. The faster the switching transition, the lower the switching loss. The second type of problem is the noise generated by the forced commutation process. This noise is predominantly caused by the rate of change of voltage, dV/dT, on the high voltage switch. This change in voltage, coupled with the parasitic capacitance of the transformer primary-to-secondary windings, causes common mode current to flow through this path. In order to help control this noise at turn off, a load line snubber is typically used. This approach requires board real estate to implement, as well as wastes energy and cost money. Furthermore, this approach only helps at turn off and the noise generation problem still exists at turn on. Ultimately, the efficiency problem associated with the conventional topology is the most severe problem. Current topology operates at about 73% efficiency, causing significant losses to be absorbed by the power supply package, thus driving the power supply density down.

Two types of newer generation prior art topology, shown in FIGS. 1A and 1B, attack the problems associated with the previous art described above. The first type of topology is the series resonant power supply switching at zero current. These supplies reduce the noise generated by switching at very close to zero current (magnetizing current) and eliminate about half of the switching losses without the need for the load line shaping circuits. There is still the loss associated with switching voltage at the switch turn on point however. During the switching transition, there can be significant voltage across the switch that essentially charges the parasitic capacitance of the switch, which is ultimately discharged by the action of turning on the switch. A typical power fet, having a drain-to-source capacitance of 120 pf, operating at 100 khz with a voltage of 700 volts across it can have a parasitic loss of approximately 2.98 watts. The rate of change of current is also lower as the current (dI/dT) is sinusoidal. The major problem with the type of converter shown in FIG. 1A is in the RMS current relationship vs line. The peak currents flowing in the resonant switches, transformer, and output diodes are at their lowest during low line operation when the duty ratio is maximum. The efficiency at this point can be in the low eighties. When the input voltage is raised, however, the RMS current flowing in the power supply elements will rapidly increase causing the RMS current to increase by as much as 1.7. This ultimately causes the efficiency to drop into the low 70's, where the original forced commutation power supply operates. There are ways to overcome this phenomenon, however, but this would require the addition of a new converter in front of the resonant to stabilize the input voltage, thus optimizing the efficiency. The extra cost incurred and extra board real estate required makes this approach viable only in the higher power arena. Operation of this type of converter is exemplified in U.S. Pat. No. 4,415,959 to Vinciarelli.

A more recent approach to this problem with RMS currents is shown in FIG. 1B and exemplified in Matsushita Japanese patent No. 1503925. In this type of resonant converter the resonant circuit is a combination of both series and parallel resonant circuits. In this type of approach the frequency shift of the power supply over the regulating area is greatly reduced. In the Vinciarelli type converter the frequency shift could be over 10:1 for all conditions, and even more if no-load operation is required. In the series/parallel converter, the frequency shift is a function of the ratio between the parallel inductance and series inductance of the tank circuit. Practical frequency shifts can thus be enjoyed of only 2:1. Since the energy being transferred to the output load is a function of not only the voltage in the resonant circuit ($\frac{1}{2}CV^2F$) but is also a function of the phase relationship between two resonant circuits, the RMS current flowing in the switches, transformer, and diodes changes little with corresponding changes in input line. This, in effect, stabilizes the efficiency vs line characteristics of the power supply. The resonant tank losses tend to increase with line in the series parallel converter but the RMS currents in the switch, transformer, and magnetic tend to remain the same. One of the major drawbacks of the Matsushita approach is the inability to adjust the tank operating voltage. In all resonant converters, the Q of the tank circuit is of paramount importance to the overall efficiency of the power converter. One dominant means of controlling losses for any given power output in the resonant design process is to pick a low operating current in the tank circuit. In previous prior art converters (Vinciarelli: U.S. Pat. No. 4,415,959, Japanese Patent No. 1503925) the operating tank voltage is not adjustable independent of the operating voltage ratios of the converter. This forces the designer to adjust other equally important parameters such as leakage inductance, resonant capacitor value, and operating flux density. The result of this is a greatly reduced design efficiency due to lower Q as well as a larger tank capacitor and potentially a more difficult magnetic element from a manufacturing viewpoint. Also, since the ratio of tank magnetizing inductance vs tank voltage cannot be manipulated in prior art converters, the minimum frequency shift is difficult to optimize. In the prior art converter by Archer U.S. Pat. No. 4,774,649, a novel resonant converter is described which is constructed on a integrated magnetic element. In this approach, some control over the tank operating voltage is available; however, this control is given at the expense of other variables and the integrated magnetic transformer tends to have a low operating Q for this reason.

Finally, the remaining problem associated with both the Vanciarelli and Matsushita converters is the inability to operate in both the zero current and zero voltage mode simultaneously. As stated earlier, a controlled rate of change of voltage (dV/dT) is desirable to achieve quiet operation from an EMI/RFI standpoint. To further complicate this requirement, it is desirable to achieve this without the use of external components, as part count and size have a direct impact on the size of the finished supply.

OBJECTS OF THE INVENTION

In view of the above problems with the prior art, the object of the present invention is to provide a novel solution in which the primary switching takes place at very near zero current while maintaining a substantially sinusoidal shape during the switching intervals.

Another object is to achieve zero voltage switching of the primary switch, thus having a controlled rate of voltage change across the primary of the transformer without the addition of external parts and facilitating the removal of the parasitic switching loss associated with interrupting voltage at high frequency.

Another object is to achieve the ability to transform the tank operating voltage to any desirable voltage through the use of a tank transformer assy.

Other objects include increase operating efficiency, increased reliability, and decreased cost and noise. These objects are realized in a novel invention employing a resonant tank transformer assy. This assy is placed in series with either the output or the input of any multi ended transformer used in DC to DC conversion. It has one winding used for the resonant tank which is connected to a resonant capacitor and at least two additional windings, one for each side of the transformers windings if on the primary and at least two windings for each output if placed in the secondary with each of the two windings being placed in series with each respective secondary windings ground. The additional output windings being correctly ratio to achieve balanced reflected voltages.

In a secondary referenced tank implementation, the following would be typical of implementation. The primary winding of a push pull transformer would have opposing phases connected to a DC supply voltage, the corresponding secondary would have their correctly phased outputs connected to a corresponding rectifier and their ground sides would be hooked to one winding respective of the resonant transformer assy with each respective winding of the resonant assy being out of phase with respect to the other. The corresponding output of the resonant assy would be tied together and hooked to the ground of the output smoothing capacitor with the other side of the smoothing capacitor hooked to the output of the rectifiers. Current flow through the primary is established by means of a pulse fashion with the off time of both switches being held constant and the on time controlled by means of an error amplifier responding to changes in the output load. The leakage field of the transformer is tuned to the resonant transformers resonant capacitor with the leakage inductance being scaled through the transformers respective secondary to tank winding ratio. This resonant frequency is set to about twice the parallel tank frequency which is set by the magnetizing inductance of the tank winding. The currents flowing in the primary and secondary windings are thus forced to take on a sinusoidal shape in response to the common sinusoidal flux flowing in the tank transformer assy.

Various embodiments of the invention are shown including resonant tank transformer assy on the primary and resonant tank assy on the secondary.

These and other features and advantages of the invention will be apparent to those skilled in the art of power supply design, especially DC to DC converters, after a review of the detailed review of the preferred embodiments, taken together with the accompanying drawings.

SUMMARY OF THE INVENTION

The present invention optimizes the Q of the resonant tank via selection of core material and operating flux density and frequency; tank capacitor utilization via adjustment of the turns ratio between load and tank windings; minimizes the minimum-to-maximum frequency shift for regulation via the selection of core permeability and the ratio of tank winding to load winding. This is made possible by the use of a transformer for the parallel resonant tank circuit.

THE DRAWING

FIGS. 1A and 1B show, respectively, two forms of prior art circuits.

FIGS. 3A–3G and 4A–4G are wave forms present in the circuit of FIG. 2 under relatively heavy and relatively light load conditions, respectively.

Figure 2:
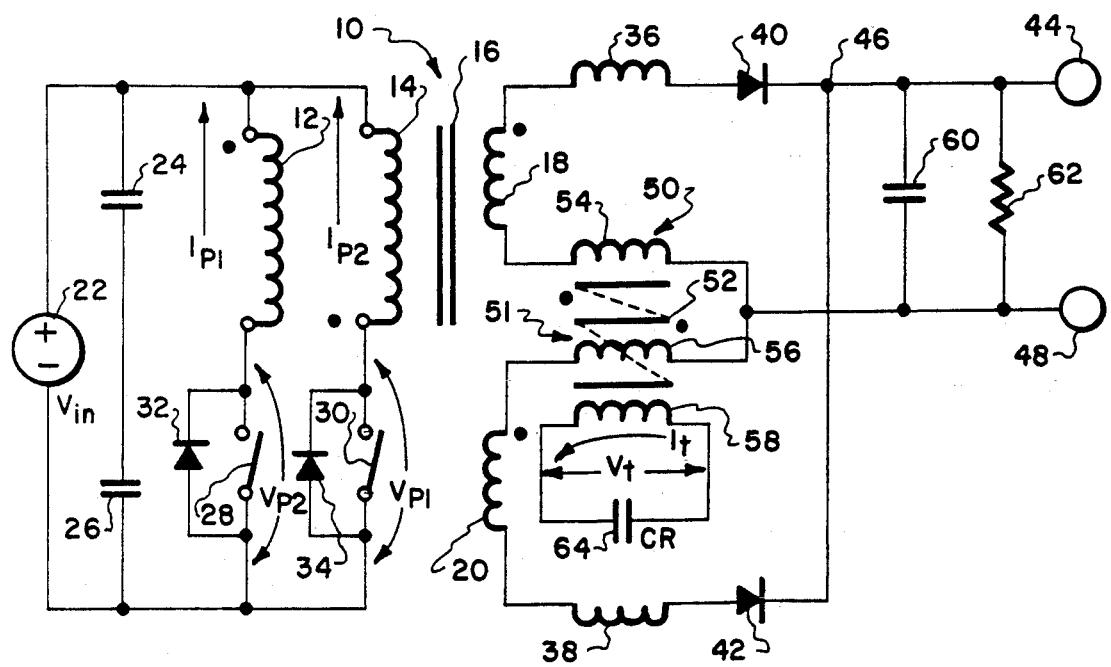
FIG. 2 is one embodiment of the present invention, with the tank circuit located in the secondary of the main transformer.
Figure 5:
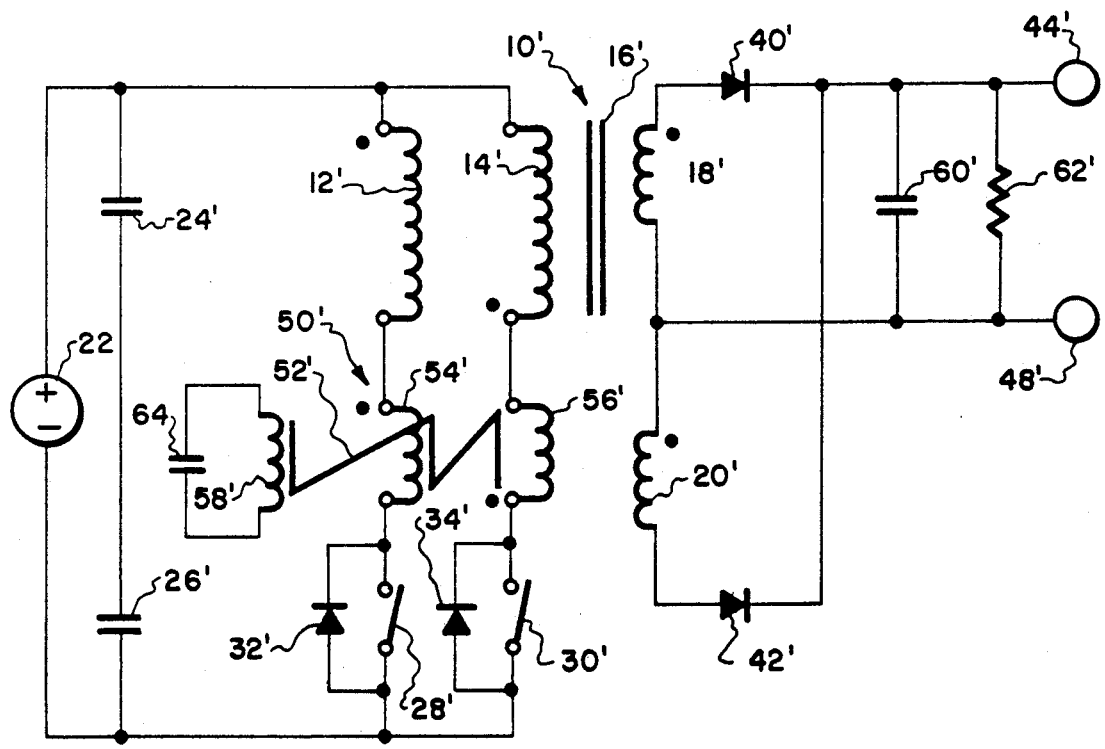
FIG. 5 is an alternative embodiment of the invention, with the tank circuit located in the primary of the main transformer.

FIG. 6 is a control circuit for operating the switching devices 28, 30, 28', 30' of FIGS. 2 and 5 to create waveforms depicted in FIGS. 3 and 4. The details of operation of FIG. 6 are set forth in Motorola publication entitled Semi conductor Technical Data Prototype Information, High Performance Resonant Mode Controller, PC34067.

DETAILED DESCRIPTION

An embodiment of the invention is shown in FIG. 2, wherein 10 refers to a main transformer having primary windings 12 and 14, a core 16, and secondary windings 18 and 20. Windings 12 and 14 have equal turns, oppositely wound as shown by the conventional dots, so that primary currents ($I_{p1}$) and ($I_{p2}$) produce opposite flux in core 16. Windings 12 and 14 are fabricated such that there is minimal parasitic capacitance and leakage inductance between windings.

Power is supplied from a DC source 22, bridged by capacitors 24 and 26, which serve to remove ripple and also provide a stable source of power for the converter.

Windings 12 and 14 are connected in parallel across the input voltage 22. In series with winding 12 is a control switch 28; in series with winding 14 is a control switch 30. Switches 28 and 30 are operated alternately, by the control circuit shown in FIG. 6, and with a predetermined delay or dead time between the opening of one switch and closing of the other. Switches 28 and 30 are mosfets having intrinsic diodes 32 and 34, respectively, which clamp the voltage swing after the opposite switch turns off.

The delay time is effected by, inter alia, designing a predetermined parasitic capacitance into the control switch means 28, 30, 32, 34. The main transformer 10 is designed such that the magnetizing current will be great enough to charge the parasitic capacitance of the Primary windings 12, 14 in a controlled fashion.

Magnetically linked, by the core 16, to the primary windings 12 and 14, are secondary windingS 18 and 20, wound to phase with the windings 12 and 14 as shown by the dots. Inductances 36 and 38 are not discrete circuit elements, but represent the leakage field of the windings 12, 14, 18, 20 reflected into the secondary.

Output from the secondary is rectified by any suitable means, exemplified here by diode 40 in series with winding 18, and diode 42 in series with winding 20. Output from diodes 40, 42 is tied to the output terminal 44, as shown at 46.

Interposed in the secondary between windings 18, 20 and the output terminals 44,48 is a tank circuit 50 comprising a resonant tank transformer 51 having a core 52 and associated windings 54,56,58. Winding 54 is in series with secondary winding 18; winding 56 is in series with 20. The two outputs are tied together to the terminal 48. Capacitor 60 across output terminals 44/48 smooths the output. Resistor 62 represents the output load on the converter. Thus the windings 54 and 56 are responsive to the load current of the converter. The third winding 58 constitutes a tank winding across which is a tank capacitor 64.

The resonant tank transformer 51 serves two basic functions. One, it controls the current shape through the main transformer 10 via the common flux linkages of the resonant tank winding 58 and the associated windings through which all the current flowing in the main transformer 10 must flow. Two, it enables the designer to minimize the losses in the resonant tank elements 58/64 as well as control the frequency shift via the ability to set the tank operating voltage via the transformer turns ratio relationship, as well as set the ratio of tank magnetizing to reflected leakage inductance of the main transformer 10.

FIG. 5 is similar to FIG. 2 with the tank circuit 50 moved from the secondary of the main transformer to the primary as shown at 50'. As with the circuit 50 the tank 50' is located to be responsive to the load current through 62. Correspondence between the components of FIG. 5 and FIG. 2 is indicated by a prime ' symbol applied to the numerals in FIG. 5.

The winding 54', corresponding to winding 54 of FIG. 2 is in series with primary winding 12'; and winding 56' is in series with winding 14'. As with core 52 of FIG. 2, core 52' in FIG. 5 is common to all three windings 54', 56' and 58'.

The wave forms of FIGS. 3 and 4 carry over to the circuit of FIG. 5 substantially unchanged. In the primaries of FIG. 5 there is a small magnetizing current flowing through the windings 54' and 56' which causes a negligible distortion.

OPERATION

The operation of FIG. 2 is as follows: Switch 28 is closed to initiate a cycle. Assuming the converter is in steady state condition (not at start-up), then the timing of this switch closure corresponds to an appropriate phase relationship of the resonant tank transformer 51. Current will build in the winding 12 and corresponding switch 28 in a sinusoidal way, due to the influence of the tank transformer flux and the circuit generated by the leakage inductance of the output circuit 36 and the reflected tank magnetizing inductance. From circuit 50 there is thus formed a series resonant tank until the tank voltage has sufficiently reversed and the output diode 40 turns off. At this time, the primary switch 28 may continue to stay on, but the current will have ramped down and intersected the magnetizing current of the transformer 10. When the controller of FIG. 6 turns off the switches 28/30, both switches will remain off while the voltage across switch 28 and switch 30 reverse, until their respective diodes 32/34 conduct. At this point, the respective voltages are at their zero point and the alternate switch 30 may be turned on. The alternate secondary winding 20 will now conduct through its series resonant path 38/51 and the currents from the previous cycle will be repeated in the opposite direction. This timing relationship will be maintained until the load changes. When the load is increased, the control circuit of FIG. 6 will decrease the on time of both switches, effectively raising the operating frequency of the converter. The delay or dead time between the switches will remain the same, however, as the voltage reset time will change only slightly due to the magnitude of the turn off current. The turn off current is always the magnetizing current, as the load current diminishes to the magnetizing current point during each cycle assuming the supply is operating within its load boundaries. The remaining magnetizing current, flowing through the parasitic capacitance of the switches and winding, will drive the voltage to the respective clamp point in a time determined by the size of the capacitance and the magnitude of the current. This drive current changes with frequency as the on time changes with frequency, but this change is not enough to cause any wide change in dV/dT. The effective change in a practical implementation would be about 2:1. In this manner, the converter operates in a zero voltage mode, thus avoiding the noise and loss problems associated with switching on and off with a voltage across the switch. This loss can be approximated knowing the voltage across the switch and the size of the parasitic capacitor as well as the operating frequency. In a typical fet driven high frequency converter operating off a high voltage buss (300 v), this loss would be approximately 2 watts, thus requiring heatsinking and increasing the size of the power supply as well as increasing the size of the input filter. As the control circuit increases the frequency in response to an increased demand for power, the series resonant time will increase and the time current flowing through the respective reflected leakage field and secondary diode will increase. The inverse is true when the demand for power goes down and the corresponding operating frequency goes down FIG. 3 shows the relationship of the converter waveforms at a medium to relatively heavy load condition. Waveforms A and B are the respective drives from the control circuit of FIG. 6 to the corresponding switches 28 and 30. Waveforms C and D are the respective currents $I_{p1}$ and $I_{p2}$ flowing in the switches during their conductive cycle. As can be seen from these waveforms, the initial current (load current) at 100 is sinusoidal in nature ending at 102 at the magnetizing current 104 of the transformer primary (linear portion). Waveforms E and F show the corresponding voltages $V_{p1}$ and $V_{p2}$ across the switches 30 and 28, respectively, illustrating the zero voltage switching interval 106 (Forms A and B). Waveform G shows the resonant tank's 58/64 $V_t$ voltage and current $I_t$ flowing in the resonant capacitor 64, for both the series and parallel portion of the converter operation. Time $t_1$ is the time during which the equivalent circuit is a series resonant tank with the reflected leakage inductance 36 in series with the reflected resonant capacitance setting the tank operating frequency. Since this path is through the diode 40, the reflected current flows through the diode 40 to the load 62. Time $t_2$ is the time while the output diodes 40 and 42 are off, and there is no reflected leakage field in series with the tank circuit 50. The operating frequency at this point is the parallel tank frequency comprised of the tank winding 58 magnetizing inductance in parallel with the resonant capacitor 64. Times $t_3$ and $t_4$ are the identical waveforms mirrored through the action of the opposites switch action 30. FIG. 4 shows the operational waveforms of the converter under a much lighter load condition. The timing relationships are the same as FIG. 3.

What is claimed is:

1. A resonant power converter for changing the magnitude of a DC voltage, over an operating power range, comprising:
   a main transformer having core means, and primary winding means for effecting alternate flux flow in opposite directions through said core means,
   control switch means for effecting alternate pulses of current flow through said primary winding means to effectuate said alternate flux flow,
   said control switch means and said primary winding means having a predetermined parasitic capacitance with a predetermined delay time between the termination of a given pulse and initiation of the succeeding pulse,
   said transformer including a pair of secondary winding oriented to conduct alternately in phase with said alternate flux flow,
   there being inherent in said main transformer a magnetizing inductance, such that the magnetizing current will be great enough to charge said parasitic capacitance in a controlled fashion,
   secondary circuit means including said secondary windings and having rectifying means therein for rectifying the currents in said secondary windings,
   output circuit means having output terminal means and an output capacitor,
   circuit means for applying the rectified current from said rectifying means to said output terminal means in the form of a load current,
   tank circuit means comprising transformer means having load current winding means positioned in the converter to be responsive to the load current,
   a tank winding linked magnetically to said load current winding means,
   and tank capacitor means in parallel with said tank winding.

2. Converter in accordance with claim 1 wherein:
   said control switch means is responsive to the magnitude of a load applied to said output terminal means, to control the initiation and duration of each current pulse.

3. Converter in accordance with claim 1 wherein:
   The magnitude of said magnetizing inductance is established by the provision of an air gap in said core means.

4. Converter in accordance with claim 3 wherein:
   said control switch means is responsive to the magnitude of a load applied to said output terminals, to control the initiation and duration of each current pulse.

5. Converter in accordance with claim 1 wherein:
   said primary winding means comprises a pair of primary windings connected in parallel,
   said control switch means comprising a pair of control switches in series, respectively, with said primary windings.

6. Converter in accordance with claim 1 wherein:
   said tank circuit means is positioned in series with said primary winding means.

7. A resonant power converter for changing the magnitude of a DC voltage, over an operating power range, comprising:
   a main transformer having core means, and primary winding means for effecting alternate flux flow in opposite directions through said core means,
   control switch means for effecting alternate pulses of current flow through said primary winding means to effectuate said alternate flux flow,
   said control switch means and said primary winding means having a predetermined parasitic capacitance with a predetermined delay time between the termination of a given pulse and initiation of the succeeding pulse,
   said transformer including a pair of secondary windings oriented to conduct alternately in phase with said alternate flux flow,
   there being inherent in said main transformer a magnetizing inductance, the magnitude of which is established by the provision of an air gap in said core means, such that the magnetizing current will be great enough to charge said parasitic capacitance in a controlled fashion,
   secondary circuit means including said secondary windings and having a pair of diode means therein for rectifying respectively the currents in said secondary windings,
   tank circuit means comprising transformer means having a first winding in series with one of said diode means, a second winding in series with the other said diode means, and a tank winding,
   tank capacitor means in parallel with said tank winding,
   output circuit means having a pair of output terminals and an output capacitor thereacross, and
   circuit means for applying the rectified current from said diode means to said output terminals.

8. Converter in accordance with claim 5 wherein:
   Said control switch means is responsive to the magnitude of a load applied to said output terminal, to control the initiation and duration of each current pulse.

* * * * *